United States Patent [19]

O'Gwynn

[11] 4,401,923
[45] Aug. 30, 1983

[54] DIGITAL OPEN LOOP TAPE TENSION CONTROL CIRCUIT FOR TAPE RECORDERS AND THE LIKE

[75] Inventor: David C. O'Gwynn, Menlo Park, Calif.

[73] Assignee: Ampex Corporation, Redwood City, Calif.

[21] Appl. No.: 202,210

[22] Filed: Oct. 30, 1980

[51] Int. Cl.³ .............................................. B65H 59/38
[52] U.S. Cl. ....................................... 318/6; 318/315
[58] Field of Search ........................................ 318/5–7, 318/315; 242/75.44, 75.45, 75.51, 75.52, 186, 191

[56] References Cited

U.S. PATENT DOCUMENTS

| | | | |
|---|---|---|---|
| 3,061,228 | 10/1962 | Andrade | 242/75.51 |
| 3,411,055 | 11/1968 | Carter et al. | 242/75.51 X |
| 3,849,661 | 11/1974 | Beiter | 242/75.52 X |
| 3,938,757 | 2/1976 | Sargunar | 242/186 |

*Primary Examiner*—Ulysses Weldon

*Attorney, Agent, or Firm*—George B. Almeida; Joel D. Talcott

[57] ABSTRACT

An open loop tension servo uses digital circuitry to automatically control motor torque and thus tape tension in, for example, a tape recorder, without the need for a tension sensor. To this end, the tape pack diameter of a tape takeup or supply reel is digitally computed, thus determining the motor torque required to maintain the requisite tension on the tape during the record or replay operating mode. A binary number indicative of the instantaneous tape pack diameter is generated and stored until a new number is available. Each stored number is supplied to D/A converter means formed of selected parallel or series resistor, arrays, wherein specific resistor combinations are successively selected to provide a corresponding change in resistance commensurate with the changing pack diameter represented by the changing size of the binary number. The resulting analog motor control voltage is fed to the motor drive amplifier to continuously regulate the motor torque and thus provide a constant tape tension as the tape pack diameter changes.

15 Claims, 6 Drawing Figures

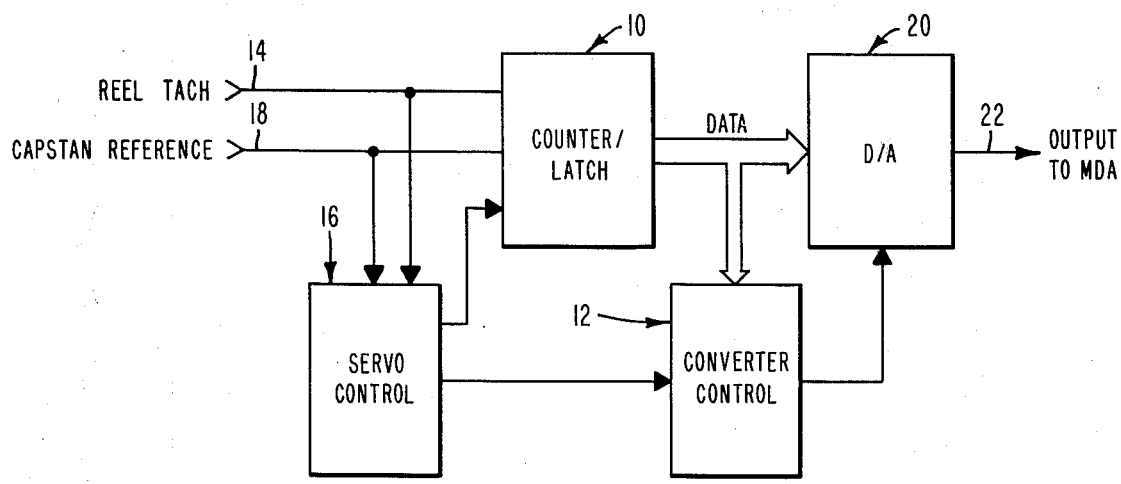
FIG_1
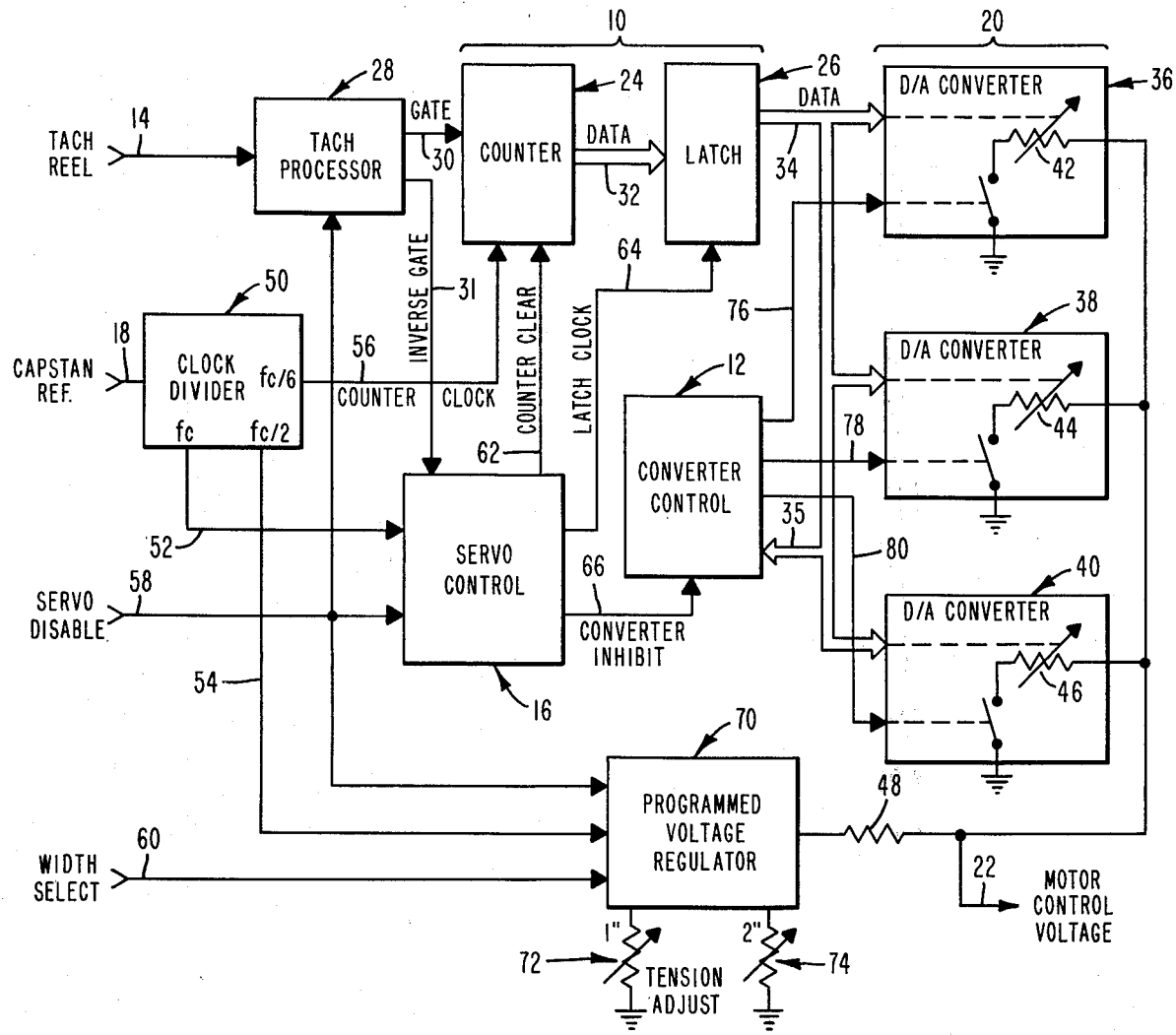
FIG_2

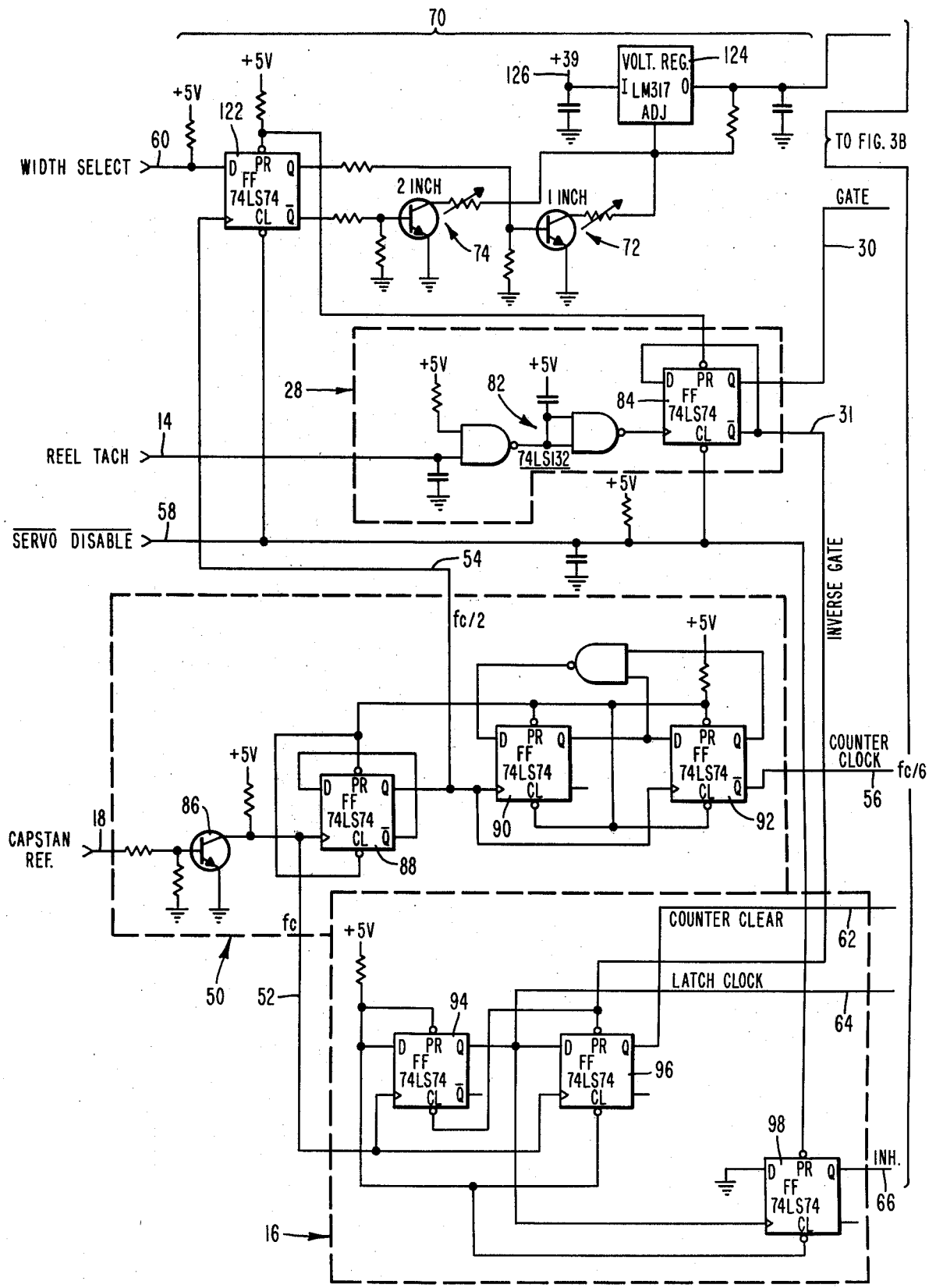
FIG_3A

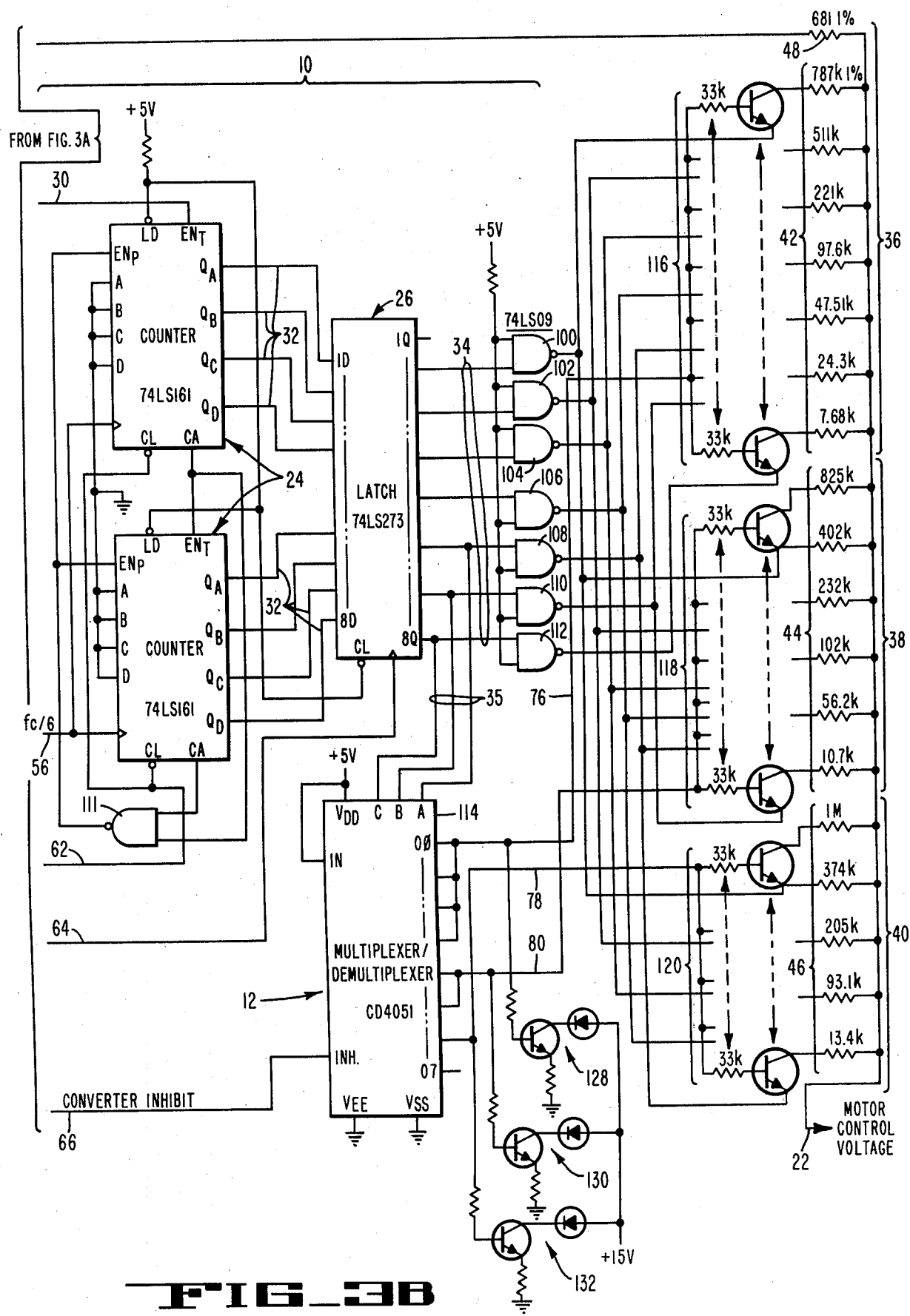
FIG_3B

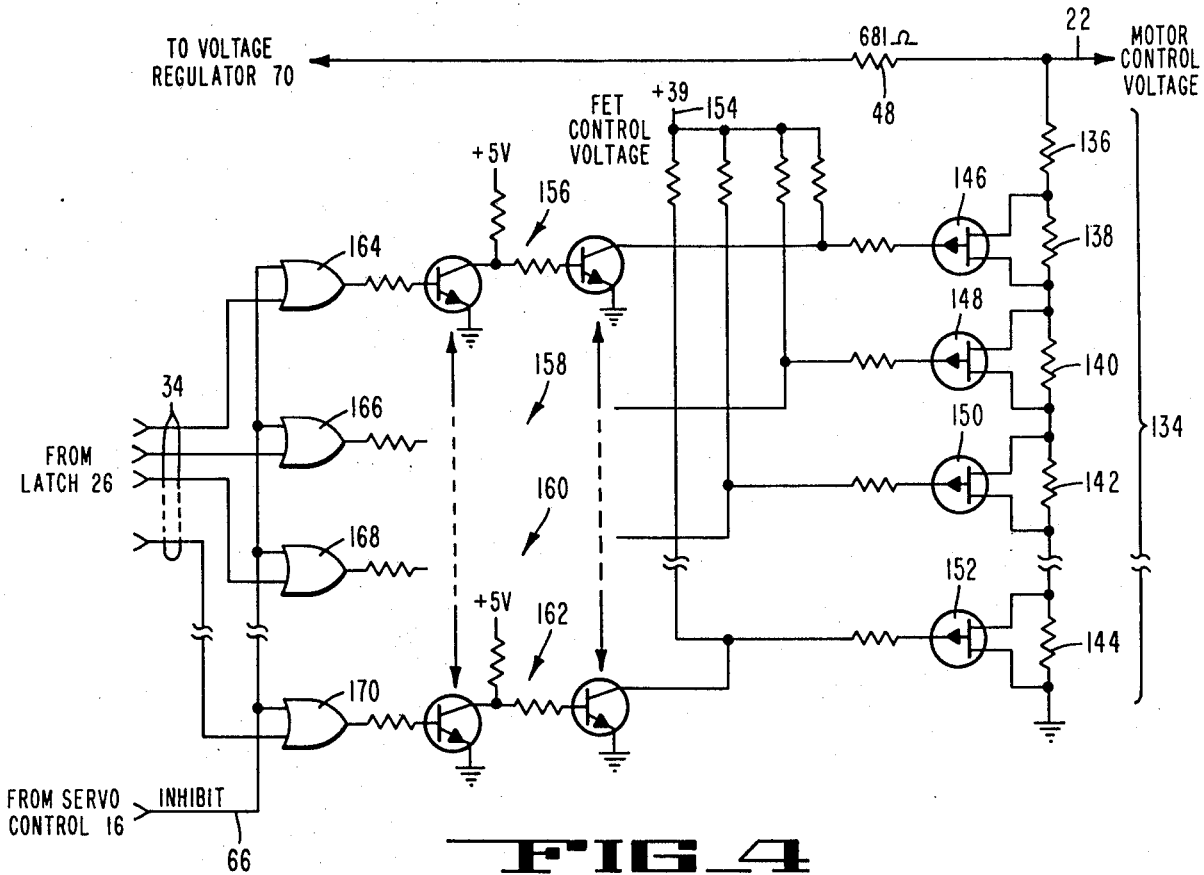
FIG_4
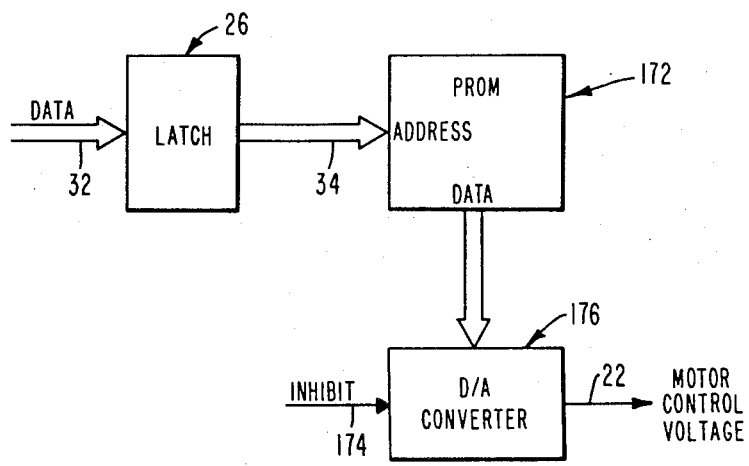
FIG_5

DIGITAL OPEN LOOP TAPE TENSION CONTROL CIRCUIT FOR TAPE RECORDERS AND THE LIKE

BACKGROUND OF THE INVENTION

The invention relates to tape tension control circuits and particularly to a digital open loop servo circuit for automatically controlling the tension on a tape without need for a tension sensing transducer.

Various closed loop tension control circuits are available, for example, in the tape recorder/reproducer art, wherein tension sensors are used to detect instantaneous tape tension. A corresponding feedback signal then is supplied to regulate the torque of the associated motor, or to adjust a tape tension arm, to maintain a preselected tape tension. Typical of such closed loop systems are those described in, for example, U.S. Pat. No. 3,535,441 to A. G. Grace and U.S. Pat. No. 3,936,008 to J. N. Crum.

In addition, various open loop tension control circuits also are available, employing analog circuits, which preclude the need for tape tension sensors. Typical of such an open loop system is that employed in the tension accessory control apparatus in the Ampex Corporation AG-440 professional audio recorder and described in the tension accessory control Model TS-40 Manual, catalog No. 4890404. Further typical of such analog, open loop tension systems are those described, for example, in U.S. Pat. No. 3,871,598 to H. Kataoka; U.S. Pat. Nos. 4,084,768 and 4,090,679 both to K. Hayashi, etc.

Thus, in situations where tape tension sensors are not available, or where it would be undesirable to include tension sensors, it is preferable to use an open loop servo system to control tape tension. However, open loop analog circuits are prone to drift and are difficult to match to motor characteristics. In addition, integrated circuits such as, for example, linear operational amplifiers, are not readily available which can operate at the higher voltages found in many tape recorder, etc., apparatus.

Thus, digital open loop tension control circuits have been provided with their inherent stability advantages in systems wherein tape tension transducers are not available or desired. Typical of such digital tension control circuits are those described, for example, in U.S. Pat. No. 3,949,244 to A. M. Goldschmidt; U.S. Pat. No. 3,982,160 to A. M. Goldschmidt et al; etc. However, the latter digital circuits are generally complex, require additional input signals and do not provide D/A converter means which readily can be matched to the motor characteristics. Thus the circuits do not provide the precision of tension control which is possible in the present invention.

SUMMARY OF THE INVENTION

The present invention provides a relatively simple, open loop, digital, tension control circuit which overcomes the shortcomings of analog and digital open loop systems, while precluding the need for tape tension sensors. To this end, reel tach pulses indicative of the reel speed, and capstan reference pulses indicative of the tape speed, are supplied to counter means. The latter generates a binary number that represents the instantaneous tape pack diameter as tape is pulled onto the reel. The number is supplied to digital-to-analog converter means formed of a selected array or arrays of specific combinations of precision resistors. The resistors are selectively switched in parallel or in series with each other in predetermined combinations determined by converter control means which responds to the size of the binary number and/or by the logic states of respective bits of the binary number. The resistor combinations form the lower portion of a resistive voltage divider which supplies the tension control voltage, i.e., the takeup motor control voltage, to the motor drive amplifier. The resistances of the successive resistor combinations are directly related to the motor torque required as the tape pack diameter changes, and thus to the corresponding requisite tension. The resistor values are preselected to compensate for any non-linearities in the motor characteristics.

Thus, it is an object of the invention to provide an open loop, digital, tape tension control circuit which regulates the tension on tape when pulled onto a reel during the record or playback mode.

It is another object of the invention to digitally generate a binary number indicative of the instantaneous tape pack diameter, which regulates the motor control voltage in relation to the motor torque required to maintain a constant tape tension.

Another object is to provide resistive D/A converter means formed of continuously selectable combinations of parallel or series resistances commensurate with the changing tape pack diameter and thus with the motor control voltage needed to supply the requisite tape tension.

BRIEF DESCRIPTION OF THE DRAWINGS

FIG. 1 is a block diagram depicting the invention combination.

FIG. 2 is a block diagram of the combination of FIG. 1 in greater detail.

FIGS. 3A-3B are schematic diagram of an implementation of the combination of FIGS. 1 and 2.

FIGS. 4 and 5 are schematic and block diagrams respectively, of alternative embodiments of the invention combination.

DESCRIPTION OF THE PREFERRED EMBODIMENTS

In FIG. 1, a reel tach pulse train indicative of the speed of rotation of the reel of, for example, a tape recorder, is supplied to counter/latch means 10 and to servo control means 16, via a reel tach input 14. A capstan reference pulse train indicative of the speed of the tape also is supplied to the counter/latch means 10 and to the servo control means 16, via a capstan reference input 18. The servo control means 16 provides various clear, clock and inhibit commands to the counter/latch means 10 and to a converter control means 12. The instantaneous rotation period of the reel is obtained via the counter/latch means 10, which counts the number of capstan reference pulses which occur between reel tach pulses. The resulting count, and thus the digital data indicative of the instantaneous tape pack diameter and represented by an 8-bit binary number, is fed to non-linear digital-to-analog (D/A) converter means 20, herein formed of selected arrays of parallel precision resistors. A portion of the number is fed to the converter control means 12, which determines which of the resistor arrays is to receive the binary number as determined by the size of the number, i.e., the diameter of the reel tape pack. The logic states of the respective bits selects the actual resistors in the parallel combinations of each array as the pack diameter changes. The parallel combination of resistors forms the lower portion of a resistive voltage divider, which supplies the tension control voltage on an output 22, in the form of a takeup motor control voltage. The voltage is fed to the subsequent motor drive amplifier (MDA) which drives the respective reel motor in conventional manner.

FIG. 2 depicts further details of the tension control circuit wherein like components are similarly numbered. Thus the reel tach input 14 is coupled to a counter 24 and latch 26 of the counter/latch means 10 via a tach pulse processor 28, gate line 30 and data bus 32. The processor 28 also supplies an inverse gate command to the servo control means 16 via a line 31. The latch 26 stores the successive binary numbers indicative of the instantaneous tape pack diameter, and supplies them via data bus 34 to one of three precision resistor arrays 36, 38, 40 of the D/A converter means 20, as further described below. The resistor arrays form the lower portion (depicted as variable resistances 42, 44, 46 coupled to ground) of resistive voltage divider means, which supplies the takeup motor control voltage on output 22. A fixed precision resistor 48 defines the upper portion of the divider means.

The capstan reference input 18 is coupled to a clock divider means 50, which supplies the undivided reference clock $f_c$ to the servo control means 16 via line 52. A halved clock $f_c/2$ is fed to programmed voltage regulator means 70 via a line 54. A divided-by-six counter clock $f_c/6$ is supplied via line 56 to the counter 24.

A servo disable signal is supplied on an input 58 to the tach processor 28, to the voltage regulator means 70, and to the servo control means 16. The voltage regulator means 70 also receives a width select signal via an input 60. In response to the various inputs thereto, the servo control means 16 provides various control and timing signals. Thus, a counter clear command is fed to the counter 24 via a line 62; a latch clock is fed to the latch 26 via a line 64; and a converter inhibit command is fed to the converter control means 12 via a line 66. The programmed voltage regulator means 70 includes a pair of tension adjust potentiometers 72, 74 which are associated with the use of one or two inch tape, respectively, as further described below. The regulator means 70 is coupled to the fixed resistor 48, and thus supplies the voltage to the resistive voltage divider means which provides the output 22.

The converter control means 12 receives a selected portion of the binary number at the latch 26 output via a data bus 35 and, in response thereto, supplies one of three converter select commands to the resistor arrays 36, 38, 40 via lines 76, 78, 80, respectively.

One implementation of the circuit of FIG. 2 is depicted by way of example in FIGS. 3A, 3B wherein the operation of the circuit may be fully explained. Like components in the FIGURES are similarly numbered. Thus, the reel tach pulses on input 14 are generated by an optical sensor (not shown) which detects six holes in the takeup reel motor brake drum and generates six tach pulses during one revolution of the reel. The pulses are processed, i.e., squared, via a pair of Schmitt trigger circuits 82, and then are halved by a D-type flip-flop 84 to improve their accuracy. The Schmitt triggers 82 and the flip-flop 84 define the tach processor 28, which supplies the gate and inverse gate commands at one-half the initial tach pulse frequency, to the counter 24 and the servo control means 16 via lines 30, 31 respectively.

Obviously, other transducer means known to those skilled in the art may be provided to obtain the reel tach pulses indicative of the reel rotation, as used to gate the counter 24.

The capstan reference pulses herein are generated by the recorder crystal oscillator which determines the speed of the capstan motor, however, they may be generated by a capstan tach device coupled to the capstan, etc. The pulses are fed via a buffer 86 to the clock divider 50, and particularly to the clock input of a first of three D-type flip-flops 88, 90, 92, each of which in essence performs of divide-by-two function. The capstan reference $f_c$ also is fed to the servo control means 16 via the line 52. The capstan reference $f_c/2$ from flip-flop 88 clocks the flip-flops 90, 92 and also is supplied via the line 54 to the programmed voltage regulator means 70. The capstan reference $f_c/6$ is supplied from the flip-flop 92 to the clock input of the counter 24 via the line 56. Thus the counter 24 counts the number of capstan reference pulses which occur between the halved reel tach pulses, which define the gate command on line 30. Thus the counter 24 counts the number of pulses which occur during one-sixth revolution of the reel, to provide a digital calculation of the tape pack diameter.

The servo control means 16 includes intercoupled D-type flip-flops 94, 96 clocked by the capstan reference $f_c$ on the line 52, and a third flip-flop 98 clocked by the output of flip-flop 94. In response to the capstan reference $f_c$ and the inverse gate command on line 31, the servo control means 16 generates the counter clear and the latch clock commands on lines 62 and 64 via the flip-flops 96 and 94 respectively. The flip-flop 98 supplies the inhibit command to the inhibit input of the converter control means 12 on line 66.

The counter 24 provides an 8-bit binary number on its output data bus 32, which is indicative of the tape pack diameter, and which is latched in the latch 26 via the latch clock command on line 64 from the servo control means 16. The seven most significant bits of the binary number in the latch 26 are selectively supplied to the D/A converter means 20 via inverter means formed of open collector NAND gates 100-112. The least significant bit is unstable due to tape pack eccentricity and thus is not used.

The three most significant bits of the binary number in the latch 26 are coupled via the data bus 35 to the converter control means 12, and particularly to the control inputs of a one-by-eight multiplex/demultiplex circuit 114. The latter acts as a rotary switch to provide a converter select command on one of the select lines 76, 78 or 80 in response to a true logic state on the respective line of the data bus 35.

By way of further description, when the gate command on line 30 to the counter 24 goes to a high logic state, the counter is enabled and it counts the incoming capstan reference pulses on line 56, which are one-sixth the initial capstan reference frequency. When the gate command goes low, the counter 24 is disabled, stopping the count and providing the resulting binary number in the counter. When the gate command is low, the inverse gate command on line 31 goes high, and the servo control means 16, i.e., the flip-flop 94, delivers a latch clock to the latch 26 via line 64. The number in the counter 24 thus is latched in latch 26. Immediately thereafter, flip-flop 96 clears the counter 24 back to zero via line 62, and the counter is ready for the next cycle. If the number fills the counter then carryouts are fed back into the counter via a NAND gate 111 to lock the counter to prevent overflowing, until the counter receives the clear pulse on line 62.

The servo disable signal on line 58 provides for disabling the tension control circuit any time that the capstan is not running e.g., during the stop, rewind and fast forward modes of recorder operation. Thus, when the servo disable line 58 is low, flip-flop 84 is held clear which prevents any reel tach pulses from reaching the counter 24. Also, flip-flop 98 is preset, which inhibits the converter control means 12 and disables the converter select lines 76, 78, and 80. In addition, when servo disable is low, the flip-flop 122 of the voltage regulator means 70 (further discussed below) is cleared, which provides +5 volts at the not-true output thereof. The associated transistor is enabled and the two inch potentiometer 74 provides the full voltage (e.g., 27 volts) to the reel motor via resistor 48 and output 22, as desired during such modes of operation.

When the recorder apparatus is switched to the record or replay mode of operation, the fact that the flip-flop 84 has been held clear by the servo disable signal means the gate command on line 30 is low. At the same time, flip-flop 98 is still holding the inhibit command on line 66 high, whereby the converter select lines are disabled to allow the tension control circuit to deliver the full torque to the motor reel while accelerating the reel. Then, after the reel has been accelerated to operating speed, the occurrence of the first reel tach pulse causes the line 30 to go high, starting a count cycle in the counter 24. A valid number is generated in the counter 24 and is clocked into latch 26. Simultaneously, flip-flop 98 is clocked, generating a low on inhibit line 66, which immediately allows the multiplex/demultiplex circuit 114 to select the appropriate converter resistor array 36, 38 or 40, as determined by the size of the number that is fed to the circuit 114 via the data bus 35, as further described below. Thus the reel motor accelerates at full torque until the counter 24 generates a valid number, whereupon the tension control circuit takes over and begins to regulate the motor torque and thus tape tension in accordance with the tape pack diameter.

Once the tape has been accelerated to the proper steady-state speed, and begins to pull tape onto the smallest tape pack diameter, the seven bits of the binary word on respective gates 100-112 are selectively coupled to the emitters of seven switch transistors 116 of the selected precision resistor array 36. Meanwhile, the bases of the transistors are coupled to the select command line 76 from the multiplex/demultiplex circuit 114. The collectors are coupled to respective precision resistors 42 which, alone or in given parallel combinations, define the precision resistor array 36 which forms the lower portion of the respective resistive voltage divider of previous mention. For example, if the select command on line 76 is high, it applies base current to all the transistors 116. The emitters of each transistor are floating until grounded as, for example, by a low logic state at the output of respective inverting NAND gates 100-112. At such time, the respective emitter is grounded, pulling the corresponding resistor of array 42 to ground, thereby inserting it in parallel into the lower portion of the voltage divider. As determined by the parallel combination of resistors, i.e., by the binary number at the outputs of gates 100-112, the takeup motor control voltage at output 22 corresponds to the instantaneous tape pack diameter and thus to the torque required to maintain constant tension on the tape.

When the tape pack reaches a predetermined diameter, the second precision resistor array 38 likewise is coupled to selected gates of the NAND gates 100-110. That is, six transistors 118 and associated resistors 44 of array 38 are coupled to gates 100-110 respectively, and thus to a 6-bit word formed of all but the most significant bit. The transistors 118 pull their associated resistors to ground in response to a select command on line 78 and a low logic state on the lines corresponding to the respective emitters. Since the parallel resistor combination of array 38 is larger, a correspondingly larger servo control voltage is generated on output 22 to increase the motor torque.

When the tape pack reaches the next predetermined diameter, the third array 40 is coupled to selected NAND gates 100-108 corresponding to the five least significant bits of the 7-bit binary number, via five transistors 120. When triggered via select line 80 and low logic states on the gates, the selected transistors 120 pull their associated resistors 46 to ground to generate a still larger takeup motor control voltage on output 22 indicative of the increasing tape pack diameter.

Thus it may be seen that for a binary number more than 223, which indicates the reel is not yet reached steady-state operation, the three most significant bits of the binary number at all "1", and the multiplex/demultiplex 114 selects the output number 7 thereof, which is not coupled to anything and thus provides no select command. Thus, all transistors 116, 118 and 120 are turned off, there is no resistive load on the lower portion of the voltage divider, and the full voltage from the programmed voltage regulator 70 (e.g., 27 volts) is delivered to output 22 via the resistor 48. Such condition occurs immediately upon initiating start-up of the recorder apparatus, while it is accelerating, or when the apparatus is in rewind, fast forward or stop, etc., and the tension control circuit is not being used. After acceleration, once a valid computation is made and thus a valid binary number is generated by the counter 24, the tension control circuit then is enabled and generates the continuously changing tension control voltages as described above.

When the apparatus is not in record or replay, the multiplex/demultiplex circuit 114 is inhibited via the servo disable signal, the servo control means 16 and line 66, and the takeup motor control voltage again is maximum to provide full motor torque to the reel.

The programmed voltage regulator means 70 of previous mention, provides the full torque motor voltage of 27 volts required by the apparatus when pulling two inch tape, while further providing potentiometer means to reduce the full torque voltage when pulling one inch tape. Since the upper portion of the voltage divider, i.e., the resistor 48 is a fixed value, it is necessary to change the supply voltage to provide the requisite full motor torque for different tape widths without changing the resistor values of the arrays 36-40. Thus the width select signal on line 60 is indicative of whether a two or a one inch tape is being pulled. The signal is fed to the D-type flip-flop 122 of previous mention, which is clocked by the capstan reference $f_c/2$ via the line 54. The true and not-true outputs of flip-flop 122 are coupled to the one inch and two inch potentiometers 72, 74 respectively, via associated transistors. The output of the potentiometer which is enabled is coupled to the adjust input of a voltage regulator 124, and also to the fixed resistor 48. A selected driving voltage (e.g., 39 volts) is fed to the regulator 124 via an input 126. When two inch tape is used, the potentiometer 74 provides the full 27 volts. When one inch tape is used, the potentiometer 72 provides a given smaller voltage, e.g., 25.5 volts, whereby the reel motor generates one-half the torque as required to pull a tape of one-half the width at one half the tension required by the wider tape.

When a different tape speed is selected, the capstan reference clock on line 18 changes frequency accordingly. Thus, the basic reference for generating the binary number is changed and the correct tension is automatically maintained even at different tape speeds.

Since the digital tension control circuit is open loop, a malfunction may not be immediately detected. Thus, respective transistor/light emitting diode (LED) circuits 128, 130, 132 are coupled to converter select lines 76, 78 80, to indicate when a line goes to a high logic state to select a respective D/A resistor array 36, 38, or 40. Thus, at the start of operation, transistor/LED 128 lights to indicate the tape pack is at its smallest diameter. When the tape pack diameter increases, until, for example, approximately ten inches, transistor/LED 128 is disabled and transistor/LED 130 is enabled. When the diameter next reaches fourteen inches, transistor/LED 130 is disabled, and transistor/LED 132 is turned on. Thus, any variation from the proper lighting sequence is a visual indication of malfunction of the digital tension control circuit.

Although three resistor arrays have been described to provide tension control for a tape pack diameter up to sixteen inches, it is understood that if the maximum tape pack is less than, for example, fourteen inches (as when using a ten inch reel), then only the two arrays 36, 38 are used to provide tension control. Even smaller tape pack diameters require only one array to provide control.

Although the tension control circuit has been described herein relative to a magnetic tape recorder/reproducer, it is to be understood that the circuit may be employed with any flexible web pulling apparatus wherein it is desirable to control the tension on the web and/or the torque of an associated drive motor. Likewise, although specific values of voltages, resistances, etc., are used herein by way of example, other values may be used depending upon the application.

Furthermore, the tension control circuit may be used to monitor a web takeup reel wherein the web pack diameter is increasing, or may be used to monitor a web supply reel wherein the pack diameter is decreasing.

FIGS. 2 and 3 depict the use of various combinations of parallel resistors to define the lower portion of the voltage divider means of the D/A converter means 10. However, a series resistor array may be used in place of the parallel resistor arrays 36, 38, 40 to define the lower portion of the voltage divider means. Thus in FIG. 4, the voltage regulator means 70 is coupled via the resistor 48 (which forms the upper portion of the voltage divider means), to a series resistor array 134 of a selected number of precision resistors (e.g., seven) which form the lower portion of the divider means. Array 134 is coupled from ground to the junction of the resistor 48 and the output 22, and is depicted herein as series resistors 136, 138, 140, 142, and 144, by way of example only. The number and resistances of the resistors is selected commensurate with the range of tape pack diameters to be pulled wherein the values of the resistors 136-144 increase in size towards ground. Resistor 136 is always maintained in the array, wherein the voltage from the voltage divider means formed of resistors 48 and 136 is the minimum value thereof commensurate with the minimum torque generated at the smallest tape pack diameter.

A plurality of field effect transistors (FET) 146, 148, 150, and 152 are coupled across respective resistors 138-144 and provide means for shorting out various resistors to regulate accordingly the resistance in the lower portion of the voltage divider means. The gates of the FETs are coupled to a control voltage 154 via associated resistors, and also to respective gate or enabling means 156, 158, 160, and 162. The latter means each include, by way of example only, a pair of transistors coupled as inverters. The bases of the first transistors in each enabling means are coupled to respective OR gates 164, 166, 168, and 170. One output of each OR gate is coupled to a respective Q output of the latch 26 via the data bus 34, while the other inputs of the OR gates are coupled together to the inhibit command line 66 extending from flip-flop 98 of the servo control means 16. Note that NAND gates 100-112 are not required in FIG. 4.

Thus in operation, a "1" bit at latch 26 turns on the first emitter follower in the enabling means, which turns off the second inverter. This turns the respective FET off which places the associated resistor in the series array 134. If the bit at latch 26 is low ("0"), the respective FET is turned on, which shorts out the resistor to thus remove it from the array 134.

If the inhibit command line 66 goes low, all OR gates 164-170 are enabled, all FETs are turned on and off as determined by the status of the outputs of the latch. The conditions of the FETs determine which resistors are in the circuit. The total resistance determines the motor control voltage at output 22. If the inhibit command goes high, as when the tension control circuit is to be disabled, the FETs are all turned off, which places all the resistors 136-144 in series whereby the maximum voltage is provided as during acceleration, etc, as previously described.

FIG. 5 depicts another embodiment of the D/A converter means which may be employed within the invention combination. Thus, the latch 26 is coupled at its output data bus 34 to a programable read only memory (PROM) 172 which, in turn, is coupled to a D/A converter 176 such as the parallel or series resistor arrays of previous description. An inhibit command such as that of line 66 from the servo control means 16 is fed via a line 174 to the D/A converter 176, and functions in the manner described in FIGS. 3 and/or 4.

The PROM 172 is programmed to provide a digital number at its output which represents some function of the binary number in the latch 26, and thus the tape pack diameter and the requisite motor torque for maintaining a constant tape tension. The PROM thus readily may be programmed to compensate for different motor characteristics, without having to change the resistor values in the D/A converter 176.

What is claimed is:
1. A digital circuit for controlling the tension on a capstan driven tape being pulled onto a reel by a reel motor, comprising;
   means including counter means coupled to latch means for continuously supplying successive binary numbers indicative of the instantaneous tape pack diameter;
   means for supplying the period of rotation of the reel to the counter means and including, means for continuously generating reel tach pulses indicative of the instantaneous reel speed, and means for gen- erating capstan reference pulses indicative of the tape speed; and

D/A converter means coupled to the latch means and including continuously selectable array means of precision resistors for generating a continuous succession of analog motor control voltages in response to the successive binary numbers.

2. The circuit of claim 1 further including;

resistive voltage divider means having a lower portion formed of selectable arrays of the precision resistors; and converter control means of continuously selecting a resistor combination for the selectable arrays in response to the instantaneous value of the successive binary numbers.

3. The circuit of claim 3 wherein;

the array means includes multiple non-linear arrays each formed of selectable combinations of parallel resistors;

and the binary number comprises selected bits whose logic states are related to the tape pack diameter and determine the resistor parallel combinations within an array.

4. The circuit of claim 4 including;

at least two arrays each formed of a plurality of resistors whose various combinations provide values commensurate with the changing pack diameter and thus the requisite motor torque.

5. The circuit of claim 4 further including;

gate means coupled to the latch means and thence to the selectable resistors of a selected array in response to the instantaneous value of the binary number in the latch means; and wherein the array is selected by the converter select command from the converter control means, while the specific resistors of the array are selected by the logic states of the respective bits.

6. The circuit of claim 3 wherein;

the resistor array means includes a non-linear series of resistors selectively defining the lower portion of resistive voltage divider means; and the binary number comprises selected bits whose logic states are related to the tape pack diameter and determine the resistors placed in series.

7. The circuit of claim 7 further including;

transistor gate means operatively coupled from the latch means to the instantaneous resistors to selectively place resistors in the series in response to the binary number.

8. The circuit of claim 3 wherein;

the capstan reference pulses clock the counter means;

the reel tach pulses define a gate command to enable the counter means to continuously count the reference pulses between successive tach pulses;

the counter means generates the successive binary numbers commensurate with the count and indicative of the instantaneous tape pack diameter; and the latch means successively stores the binary numbers.

9. The circuit of claim 9 further including;

servo control means coupled to the means for generating the reel tach pulses and the capstan reference pulses for supplying the counter, latch and converter control means with clear, clock and inhibit commands respectively.

10. The circuit of claim 9 wherein the converter control means includes;

digital switch means having control inputs and converter select outputs;

wherein the control inputs are coupled to selected bits of the binary number in the latch means;

wherein one of the converter select outputs are enabled in response to a respective control input; and wherein the converter select outputs are all inhibited by the inhibit command from the servo control means.

11. The circuit of claim 10 further including;

means for supplying a servo disable signal to the servo control means to initiate the inhibit command from the latter to the converter control means.

12. The circuit of claim 10 further including;

voltage regulator means coupled to the D/A converter means to cause the latter to generate selected voltages commensurate with given tape widths; and wherein the voltage regulator means operates in a preselected width mode corresponding to the tape width in response to the servo disable signal.

13. The circuit of claim 12 further including;

a tach processor circuit coupled to the means for generating reel tach pulses, for supplying the gate command to the counter means and an inverse gate command to the servo control means;

and a clock divider circuit for receiving the capstan reference pulses and for supplying selected divided-down capstan reference pulses to the counter means and to the voltage regulator means.

14. The circuit of claim 11 further including;

LED means coupled to the switch means select outputs and responsive to the corresponding converter select commands to indicate proper operation of the circuit while pulling tape anywhere between minimum and maximum tape pack diameter.

15. The circuit of claim 3 wherein;

the D/A converter means includes programmable read only memory means coupled to the latch means for continuously generating data commensurate with the function of the instantaneous binary numbers; and a D/A converter coupled to the programmable read only memory for supplying the analog motor control voltage corresponding to the instantaneous binary number.

* * * * *

UNITED STATES PATENT AND TRADEMARK OFFICE
CERTIFICATE OF CORRECTION

PATENT NO. : 4,401,923

DATED : August 30, 1983

INVENTOR(S) : David C. O'Gwynn

It is certified that error appears in the above-identified patent and that said Letters Patent are hereby corrected as shown below:

Column 3, line 50, "nunber" should read --number--;

Column 5, line 11, "78,80" should read --78 and 80--;

Column 6, line 26, "at" should read --are--;

Column 8, line 14, "output" should read --input--;

Column 9, line 12, "of" should read --for--;

Column 9, line 48, "the instantaneous resistors" should read --the resistors--;

Column 9, line 50, "to the binary number" should read --to the instantaneous binary number--.

Signed and Sealed this

Thirty-first Day of December 1985

[SEAL]

Attest:

DONALD J. QUIGG

Attesting Officer   Commissioner of Patents and Trademarks